United States Patent
Lee

(10) Patent No.: US 6,252,874 B1
(45) Date of Patent: Jun. 26, 2001

(54) ETHERNET CARD AND ETHERNET CARD IMPROVEMENT METHODS

(75) Inventor: Chung-Wang Lee, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 0 days.

(21) Appl. No.: 09/118,938

(22) Filed: Jul. 20, 1998

(51) Int. Cl.[7] .......................... H04Q 11/00; H04L 12/66; G06F 13/00; G06F 15/16
(52) U.S. Cl. ..................... 370/389; 370/463; 710/129; 709/250
(58) Field of Search ................................ 370/389, 489, 370/401–405, 463, 492; 710/129; 709/250

(56) References Cited

U.S. PATENT DOCUMENTS

| | | | |
|---|---|---|---|
| 5,590,285 | * | 12/1996 | Krause et al. ..................... 395/200.2 |
| 5,764,895 | * | 6/1998 | Chung ................................ 395/700.8 |
| 5,926,626 | * | 7/1999 | Takeuchi et al. ............... 395/200.79 |
| 5,999,538 | * | 12/1999 | Haddock et al. ..................... 370/446 |

* cited by examiner

Primary Examiner—Alpus H. Hsu
Assistant Examiner—Duc Ho
(74) Attorney, Agent, or Firm—Bacon & Thomas, PLLC

(57) ABSTRACT

An ethernet card connected between a host computer and an ethernet includes a transmitting circuit connected between a CPU and a transceiver, a detection circuit connected between the CPU and a MAC (media access control), and an arbitration circuit to arbitrate packet data transmission order between packet data from the CPU to the ethernet and packet data from the host computer to the ethernet, wherein when the ethernet card receives packet data from the ethernet, packet data is received by the MAC through the transceiver and, at the same time the detection circuit is driven by the CPU to detect packet data received by the MAC. As a result the CPU directly drives the MAC to discard received packet data if packet data received by the MAC has nothing to do with the host computer, and the CPU immediately dispatches corresponding packet data to the ethernet through the transmitting circuit and the transceiver if packet data received by the MAC can be directly replied to by the ethernet card.

6 Claims, 3 Drawing Sheets

ETHERNET CARD AND ETHERNET CARD IMPROVEMENT METHODS

BACKGROUND OF THE INVENTION

The present invention relates to an improved ethernet card for data transmission between a host computer and an ethernet. The improvement includes a transmitting circuit and a detection circuit. Through the detection circuit, the CPU of the ethernet card detects packet data received by a MAC (media access control), so that packet data is directly discarded or replied to by the CPU if it has nothing to do with the host computer. An arbitration circuit is further added to the ethernet card to arbitrate packet data transmission order when the host computer and the CPU send respective packet data to the ethernet through the MAC and the transmitting circuit respectively at the same time.

The transmission speed of data in computer networks has become more and more faster. In an ethernet, packet data transmission capacity can be as high as 148,800 packets per second (Gigabit ethernet can be faster). Therefore, it is important to improve packet data processing efficiency when designing an ethernet card.

A conventional ethernet card 1, as shown in FIG. 1, generally comprises a CPU (central processing unit) 11, a MAC (media access control) 12, a ROM (read only memory) 13, a transceiver 14, a buffer RAM (random access memory) 15, and a bus 16. The CPU 11 controls the operation of the parts of the ethernet card 1, and runs a related network program stored in the ROM 13. When receiving and transmitting packet data, packet data is received from the ethernet by the transceiver 14, and then received from the transceiver 14 by a receiving circuit 121 of the MAC 12, and then registered in the buffer RAM 15. After inspection by the CPU 11, the CPU 11 informs the host computer 2 to read packet data from the buffer RAM 15. Packet data from the host computer 2 is sent to the buffer RAM 15 through the bus 16, and then transmitted by a transmitting circuit 122 of the MAC 12 to the ethernet through the transceiver 14. As indicated above, either in the receiving mode or the transmitting mode, packet data is registered in the buffer RAM 15 for inspection by the CPU 11, and the MAC 12 is driven to access packet data in the buffer RAM 15 after inspection. Through the bus 16, the host computer 2 reads in packet data from the buffer RAM 15 or writes packet data in the buffer RAM 15. Because the buffer RAM 15 in the ethernet card 1 is commonly used by the CPU 11 and the MAC 12, it must be divided into different memory zones for different purposes, as shown in FIG. 2, and the memory zones must be controlled through a complicated memory management procedure so that packet data can be smoothly received or dispatched.

In order to improve the transmission efficiency of an ethernet card, a complicated arbitration circuit may be installed to arbitrate the time sequence of the common use of the buffer RAM 15 by the host computer 2, the CPU 11 and the MAC 12. The installation of this arbitration circuit greatly increases the cost of the ethernet. This method does not eliminate the complicated problem of the management of the buffer RAM 15.

SUMMARY OF THE INVENTION

The present invention has been accomplished to provide an improved ethernet card which eliminates the aforesaid problems. It is one object of the present invention to provide an ethernet card which effectively and accurately performs packet data transmission to prevent erroneous packet data from passing to the host computer, so as to improve the efficiency of the network. It is another object of the present invention to provide a highly efficient ethernet card which greatly improves packet data transmission efficiency without the use of a buffer memory. According to one aspect of the present invention, a transmitting circuit and a detection circuit are added to a regular ethernet card, enabling the CPU (for example, RISC) to inspect packet data received by the MAC of the ethernet card, so that the CPU directly drives the MAC to discard received packet data if packet data received by the MAC has nothing to do with the host computer and; the CPU immediately dispatches corresponding packet data to the ethernet through the transmitting circuit and the transceiver if packet data received by the MAC can be directly replied to by the ethernet card. According to another aspect of the present invention, an arbitration circuit is added to the ethernet card and connected between the added transmitting circuit and the MAC. The arbitration circuit arbitrates packet data transmission order when the host computer and the CPU send respective packet data to the ethernet through the MAC and the transmitting circuit respectively at the same time.

DETAILED DESCRIPTION OF THE PREFERRED EMBODIMENT

Figure 1:
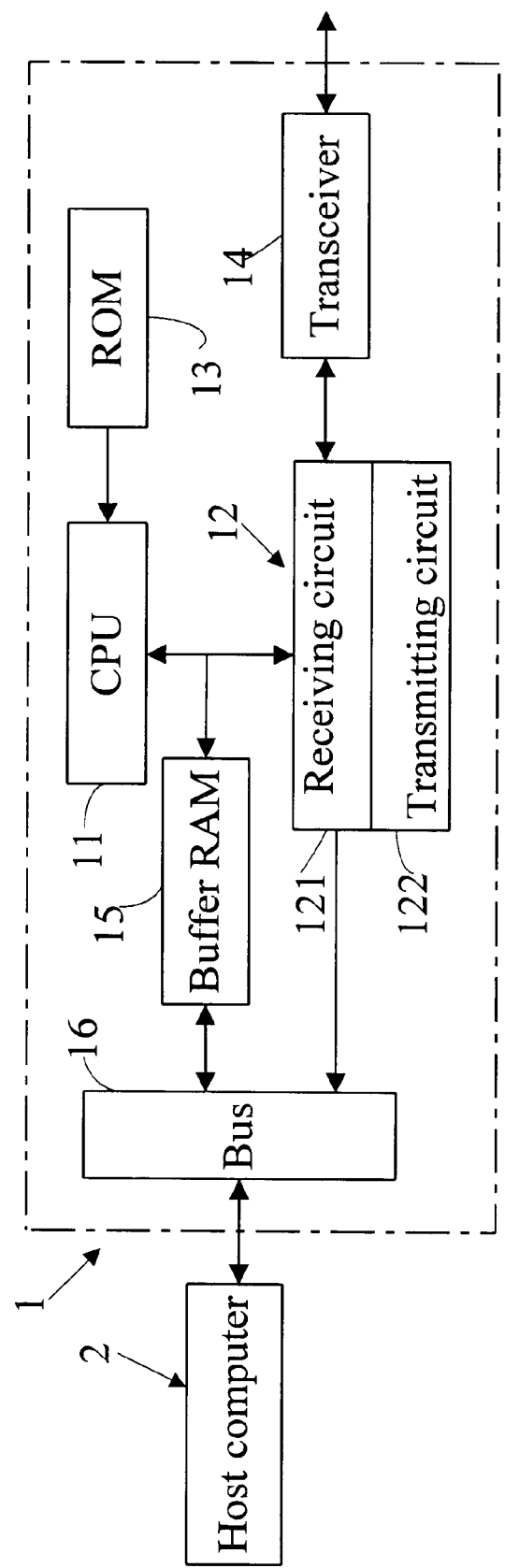
FIG. 1 is a block diagram showing the architecture of an ethernet card according to the prior art.
Figure 2:
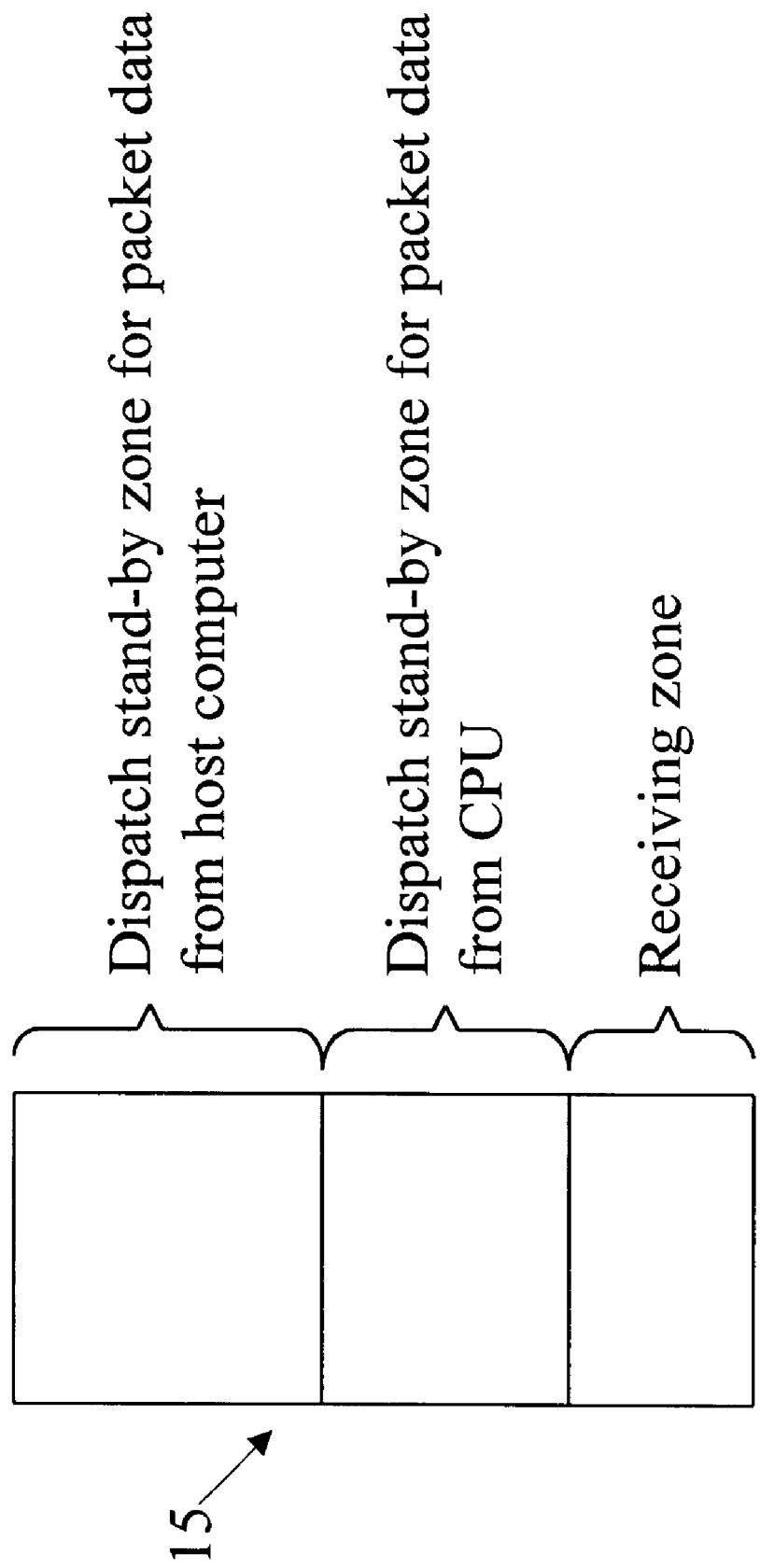
FIG. 2 shows the arrangement of the buffer memory for the ethernet card shown in FIG. 1.
Figure 3:
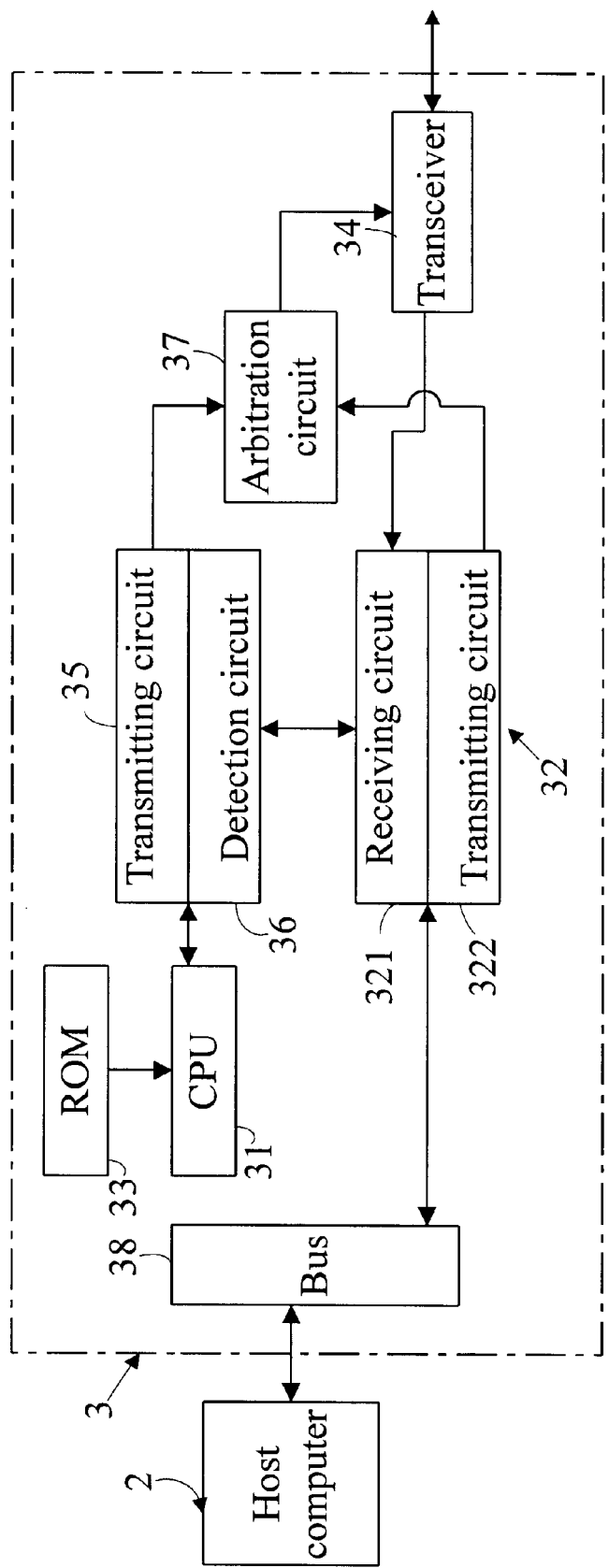
FIG. 3 is a block diagram showing the architecture of an ethernet card according to the present invention.

Referring to FIG. 3, an ethernet card 3 in accordance with the present invention comprises a CPU (for example, RISC or similar less expensive central processing unit) 31, a MAC (media access control) 32, a ROM (read only memory) 33, a transceiver 34, a transmitting circuit 35, a detection circuit 36, and a bus 38.

The CPU 31 controls the operation of the parts of the ethernet card 3, and is connected to the ROM 33 to read and run a related network program stored in the ROM 33. The CPU 31 is also connected to the transmitting circuit 35 and the detection circuit 36. The transmitting circuit 35 is connected to the transceiver 34 to send packet data from the CPU 31 to the transceiver 34. The detection circuit 36 is connected to a receiving circuit 321 of the MAC 32, to detect packet data received by the receiving circuit 321.

The transceiver 34 is connected to the transmitting circuit 35 and the MAC 32, to transmit packet data from the network to the receiving circuit 321 of the MAC 32, or to transmit packet data from the transmitting circuit 35 of the transmitting circuit 32 of the MAC 32 to the network. The receiving circuit 321 and transmitting circuit 322 of the MAC 32 are respectively connected to the bus 38. Through the bus 38, packet data can be delivered between the hot computer 2 and the MAC 32.

When the ethernet card 3 receives packet data from the network, packet data is received by the receiving circuit 321 of the MAC 32 through the transceiver 34, at this time the CPU 31 drives the detection circuit 36 to detect packet data received by the receiving circuit 321 of the MAC 32. If packet data received by the receiving circuit 321 of the MAC 32 has nothing to do with the host computer 2, the CPU 31 directly commands the receiving circuit 321 of the MAC 32 to discard received packet data. If packet data received by the receiving circuit 321 of the MAC 32 can be directly replied to by the ethernet card 3, the CPU 31 immediately dispatches corresponding packet data to the network through the transmitting circuit 35 and the transceiver 34. If packet data received by the receiving circuit 321 of the MAC 32 concerns the host computer 2, it is immediately transmitted to the host computer 2 by the receiving circuit 321 of the MAC 32 and the bus 38, and then the host computer 2 dispatches corresponding packet data to the network through the bus 38, the transmitting circuit 322 of the MAC 32 and the transceiver 34. Thus, the packet data transmission work is done.

Further, an arbitration circuit 37 may be installed in the ethernet card 3, and connected between the transmitting circuit 35 and the transmitting circuit 322 of the MAC 32. When the host computer 2 and the CPU 31 send packet data to the network through transmitting circuit 322 of the MAC 32 and the transmitting circuit 35 respectively at the same time, the arbitration circuit 37 arbitrates the packet data transmission order, enabling packet data to be sent to the transceiver 34 in proper order, and then accurately sent to the ethernet by the transceiver 34.

While only one embodiment of the present invention has been shown and described, it will be understood that various modifications and changes could be made thereunto without departing from the spirit and scope of the invention disclosed.

What the invention claimed is:

1. An ethernet card comprising:
  a CPU (central processing unit), which controls the operation of parts of the ethernet card, and reads and runs a related network program stored in a ROM (read only memory) connected thereto;
  a transceiver connected to an ethernet;
  a main transmitting circuit connected between said CPU and said transceiver for transmitting packet data from said CPU to the ethernet through said transceiver;
  a bus connected to a host computer;
  a MAC (media access control) connected between said bus and said transceiver for packet data transmission between the ethernet and the host computer; and
  a detection circuit connected between said CPU and said MAC, and controlled by said CPU to detect packet data received by said MAC;
  wherein when the ethernet card receives packet data from the ethernet, packet data is received by said MAC through said transceiver and, at the same time, said detection circuit is driven by said CPU to detect packet data received by said MAC and judge whether said packet data received by said MAC concerns said host computer,
  wherein said CPU directly drives said MAC to immediately transmit said packet data received by said MAC to the host computer through said bus if said packet data received by said MAC concerns the host computer,
  wherein said CPU immediately dispatches corresponding packet data to the ethernet through said main transmitting circuit and said transceiver if said packet data received by said MAC can be directly replied to by the ethernet card, and
  wherein the host computer dispatches corresponding packet data to the ethernet through said bus, said MAC and said transceiver.

2. The ethernet card of claim 1 wherein said MAC comprises a transmitting circuit and a receiving circuit respectively connected between said bus and said transceiver, the transmitting circuit of said MAC transmitting packet data received from the host computer through said bus to the ethernet through said transceiver, the receiving circuit of said MAC receiving packet data from the ethernet through said transceiver and sending received packet data to the host computer through said bus.

3. The ethernet card of claim 1 or 2 further comprising an arbitration circuit connected between said main transmitting circuit and the transmitting circuit of said MAC, to arbitrate packet data transmission order when the host computer and said CPU send packet data to the ethernet through said MAC and said transmitting circuit respectively at the same time.

4. An ethernet card improvement method comprising the step of adding a transmitting circuit and a detection circuit to an ethernet card having a bus, a CPU (central processing unit), a MAC (media access control) and a transceiver, enabling said detection circuit to detect packet data received by the MAC of the ethernet card and judge if packet data received by the MAC concerns a host computer to which the bus of the ethernet card is connected, so that the CPU of the ethernet card directly drives the MAC to immediately transmit said packet data received by the MAC through said bus to said host computer if said packet data received by the MAC concerns the host computer, and so that the CPU immediately dispatches corresponding packet data to the ethernet through the transmitting circuit and the transceiver of the ethernet card if said packet data received by the MAC can be directly replied to by the ethernet card.

5. The ethernet card improvement of claim 4 wherein the MAC of the ethernet card comprises a transmitting circuit and a receiving circuit for transmitting packet data from the ethernet to the host computer and from the host computer to the ethernet.

6. The ethernet card improvement method of claim 4 or 5 further comprising the step of adding an arbitration circuit to the ethernet card, permitting the arbitration circuit to be connected between the transmitting circuit and the MAC of the ethernet card to arbitrate packet data transmission order when the host computer and the CPU send packet data to the ethernet through the MAC and the transmitting circuit respectively at the same time.

* * * * *